(12) United States Patent
Pegoraro

(10) Patent No.:   US 12,579,010 B2
(45) Date of Patent:      Mar. 17, 2026

(54) METHOD AND SYSTEM FOR MANAGING A CLUSTER OF PROCESSING UNITS FOR THE SOLUTION OF A CRYPTOGRAPHIC PROBLEM

(71) Applicant: BITCORP S.r.l., Milan (IT)

(72) Inventor: Gabriele Edmondo Pegoraro, Milan (IT)

(73) Assignee: BITCORP S.R.L., Milan (IT)

( * ) Notice: Subject to any disclaimer, the term of this patent is extended or adjusted under 35 U.S.C. 154(b) by 440 days.

(21) Appl. No.: 18/356,381

(22) Filed: Jul. 21, 2023

(65) Prior Publication Data

US 2024/0028421 A1      Jan. 25, 2024

(30) Foreign Application Priority Data

Jul. 22, 2022     (IT) ........................ 102022000015489

(51) Int. Cl.
*G06F 3/00*          (2006.01)
*G06F 9/50*          (2006.01)
*G06F 21/60*         (2013.01)

(52) U.S. Cl.
CPC .......... *G06F 9/5094* (2013.01); *G06F 21/602* (2013.01)

(58) Field of Classification Search
CPC ....................................................... G06F 9/50
See application file for complete search history.

(56) References Cited

U.S. PATENT DOCUMENTS

| | | | | |
|---|---|---|---|---|
| 5,535,239 A | * | 7/1996 | Padovani ............. | H04B 7/2637 |
| | | | | 375/309 |
| 2003/0229405 A1 | * | 12/2003 | Sugihara ........... | H02J 13/00034 |
| | | | | 700/17 |
| 2014/0067151 A1 | * | 3/2014 | Erhart ............... | H02J 13/00034 |
| | | | | 700/297 |

(Continued)

FOREIGN PATENT DOCUMENTS

WO            2019204898 A1     10/2019

OTHER PUBLICATIONS

Vikas Kawadia, Power Control and Clustering in Ad Hoc Networks. (Year: 2003).*

(Continued)

*Primary Examiner* — Lechi Truong
(74) *Attorney, Agent, or Firm* — Maier & Maier, PLLC

(57)                 ABSTRACT
A method for managing a group of processing units configured to solve a cryptographic problem. The method includes a control unit of the group for: connecting to at least one computing devices network which collaborate in the search for a solution to a cryptographic problem by calculating possible solutions to the problem, determining a computing power available for each processing unit of the group; calculating a computing power of the group, based on the available computing power of each processing unit of the group, determining possible remaining solutions of the cryptographic problem which are to be calculated by the computing devices network, determining whether the computing power available of the group allows calculation of the possible remaining solutions in a predetermined time, and in the affirmative case, allocating the computing power available in the group of processing units to the calculation of the solution of the cryptographic problem.

9 Claims, 3 Drawing Sheets

(56)　　　　　　References Cited

U.S. PATENT DOCUMENTS

| | | | | |
|---|---|---|---|---|
| 2015/0316946 A1* | 11/2015 | Wenzel | .................. | G05B 15/02 |
| 2020/0026060 A1* | 1/2020 | Takato | ................. | G02B 23/243 |
| 2020/0081746 A1 | 3/2020 | Fry et al. | | |
| 2020/0163023 A1* | 5/2020 | Pelletier | ................ | H04W 52/38 |
| 2021/0097335 A1* | 4/2021 | Scriven | .............. | G06F 18/2148 |

OTHER PUBLICATIONS

Search Report with accompanying Written Opinion, issued on Mar. 7, 2023, in corresponding Italian Patent Application No. 202200015489, 7 pages.

Koops, "Predicting the confirmation time of Bitcoin transactions", arxiv.org, Cornell University Library, Sep. 21, 2018, XP081087878, 14 pages.

* cited by examiner

METHOD AND SYSTEM FOR MANAGING A CLUSTER OF PROCESSING UNITS FOR THE SOLUTION OF A CRYPTOGRAPHIC PROBLEM

TECHNICAL FIELD

The present invention refers to the sector of computer networks. In particular, the present invention concerns a method and a relative system for managing computational resources of the elements of a computer network. In greater detail, the present invention presents a method and relative system for managing computational resources of a group of devices used for the solution of a cryptographic problem, for example in the sector of distributed digital ledgers.

BACKGROUND

Encryption plays a fundamental role in the security of digital communications through computer networks as well as for the recording and storage of data therein. In fact, only through the correct use of communication and data encryption tools it is possible to guarantee that the transmitted or stored data comes from a reliable source and/or have not undergone an alteration during transmission or storage.

A fundamental requirement for an effective encryption system is to possess a complexity that makes it unlikely or extremely costly from a hardware point of view for an unauthorized entity to be able to counterfeit the data transmitted and/or stored in a computer network. To meet this complexity requirement, the encryption systems require considerable computational power and, consequently, substantial hardware resources to perform data cryptography and decryption in short times.

Moreover, in the sector of the distributed digital ledgers, for example a blockchain, each block of data added to the ledger must be confirmed through the solution of a highly complex cryptographic problem. As it is known, the nodes of the computer network that manages the distributed digital ledger compete with each other to find a solution to the cryptographic problem and receive a reward.

Consequently, there is a tendency for frequent renewal of the hardware of the nodes of the computer network in order to increase the computational power of the nodes. However, the complexity of the cryptographic problem is proportional to the overall computational power of the computer network, therefore, this continuous updating of the hardware causes a positive reaction that makes the obsolescence of the used hardware faster and faster.

In an attempt to limit the hardware requirements necessary for a single device in order to participate in the computer network that manages the distributed digital ledger, a subnet has been developed, defined as mining pool in jargon, through which multiple devices connected to each other operate as a single node of the network. However, mining pools can only mitigate the problems set forth above, given that within the mining pools there is basically the same competition among the devices for the solution of the cryptographic problem with the same disadvantages mentioned above.

In addition, several techniques have been proposed in an attempt to optimize the operation of the nodes of the network. For example, WO 2019/204898 describes a method for scheduling operations in a computer system. The method envisages collecting telemetry data of the nodes of the network and creating a system profile based on the collected data. The method envisages calculating a monetary value of the computer system as a function of an executable operation and of the system profile. Finally, the operation to be performed is selected based on the calculated monetary value.

US 2020/081746 describes a system configured to connect to a blockchain network comprising a plurality of nodes and configured to store a common work element. The system calculates the workloads necessary for the nodes to complete the current tasks, to determine an impact of the network load based on the execution of a common process for verifying the consent of the nodes. The calculated and determined loads of the network load impact are used to select new operations to assign to the nodes.

D. Koops: "*Predicting the confirmation time of Bitcoin transactions*", Arxiv.org, 21 Sep. 2018, https://doi.org/10.48550/arXiv.1809.10596, describes a probabilistic distribution of the confirmation time of the Bitcoin transactions, conditioned by the current state of the memory pool of the network (i.e. the transaction queue awaiting confirmation). This analysis is applied to the prediction of the trend of the Bitcoin transaction recording, in particular, during "heavy traffic situations", i.e. when the demand for transaction recording exceeds the memory capacity of the blockchain block.

However, these solutions do not allow to obtain the strongly felt need in the sector to develop networks able to optimally exploit the available computational load and reduce the minimum hardware requirements required of the nodes of the computer network.

SUMMARY

An object of the present invention is to overcome the drawbacks of the prior art.

In particular, an object of the present invention is to provide a method and a related system for efficiently exploiting the computational power of a computer network for the solution of a cryptographic problem.

A further object of the present invention is to propose a method and a related system for the efficient management of the computational power of a group or cluster of processing units connected to a computer network configured to calculate the solution of a cryptographic problem associated with the addition of a block to a distributed digital ledger.

These and other objects of the present invention are achieved by a system incorporating the features of the annexed claims, which form an integral part of the present description.

According to a first aspect, the present invention is directed to a method for managing a group of processing units configured to solve a cryptographic problem. The method envisages that a control unit of the group performs the steps of:

connecting to at least one computing devices network which collaborate in the search for a solution to a cryptographic problem by calculating possible solutions to said cryptographic problem, determining a computing power available for each processing unit of the group of processing units.

In addition, the method comprises:

calculating a computing power of the group based on the available computing power of each processing unit of the group, determining a number of possible remaining solutions of the cryptographic problem which are still to be calculated by the computing devices network, determining whether the computing power available in the group allows calculating said possible remaining solutions in a predetermined period of time, and in the affirmative case, allocating the computing power available in the group of processing units to calculate the solution of the cryptographic problem.

Thanks to the proposed method, it is possible to optimize the use of the computing power available in a group of processing units. In particular, it is possible to limit energy consumption by concentrating the computing power available to the solution of cryptographic problems for which there is a high likelihood of finding the correct solution in a short time. Moreover, thanks to the distribution of the computational load performed by the control unit, it is possible to optimally exploit the computing power made available by each processing unit of the group. This makes it possible to successfully exploit processing units with limited computational capacity and/or relatively obsolete devices, extending their useful life and, consequently, slowing down the generation of the so-called e-waste.

In one embodiment, the control unit of the group is meant to acquire the following information from the computing devices network:

a number of processors of the computing devices network that are actively seeking possible solutions of a cryptographic problem, a measure of the computation difficulty of the correct solution to the cryptographic problem, and a number of possible solutions to the cryptographic problem already calculated by the processors of the computing devices network.

In addition, this information is used to determine the number of possible solutions of the remaining cryptographic problem.

Preferably, the method comprises training an artificial intelligence algorithm to determine the number of possible remaining solutions of the cryptographic problem. In detail, the artificial intelligence algorithm is trained by monitoring the trend of the calculation of possible solutions to the cryptographic problem carried out by the processors of at least one computing devices network.

In one embodiment, the method comprises calculating an indication of the computing power necessary to calculate the possible remaining solutions.

In this case, the step of determining whether the computing power available in the group of processing units allows to calculate said possible remaining solutions in a predetermined period of time is based on said indication of the computing power necessary to calculate the possible remaining solutions.

Preferably, the possible solutions of the cryptographic problem are hashes and it is provided for performing the further step of calculating a hashrate necessary to calculate the possible remaining solutions within said predetermined period of time on the basis of said indication of the computing power necessary to calculate the possible remaining solutions.

Even more preferably, the computing power necessary to calculate the possible remaining solutions is determined by also considering a data transmission capacity among the processing units of the group.

In one embodiment, the method further comprises calculating a number of virtual machines that can be currently run in each processing unit of the group. Each virtual machine implements a computing device configured to calculate at least one possible solution of the cryptographic problem.

In this case, the step of determining whether the computing power available in the group of processing units allows to calculate said possible remaining solutions in a predetermined period of time provides for verifying whether the computing power of the virtual machines that can be currently allocated allows calculating said possible remaining solutions in the predetermined period of time.

Preferably, the virtual machines are graphics processing units (GPUs).

In one embodiment, the method comprises training an artificial intelligence module—executed by the controller node—to determine the computing power necessary to calculate the remaining solutions to the cryptographic problem and whether the available computing power reaches that value. In detail, the artificial intelligence algorithm is trained by monitoring the trend of the calculation of possible solutions to the cryptographic problem carried out by the computing devices of at least one computing devices network and the trend of the operation of the processing units of the network, for example in number of instantiable virtual machines, continuity of operation, data exchange speed, etc.

For example, the artificial intelligence module comprises a first machine learning algorithm trained by monitoring the trend of the calculation of possible solutions to the cryptographic problem carried out by the processors of at least one, preferably a plurality of processor networks for determining the number of possible remaining solutions. A second machine learning algorithm is trained to analyse the trend of the operation—i.e. on the basis of operation data—of the processing units of the network—for example, in number of instantiable virtual machines, continuity of operation, data exchange speed, etc.—during test periods (e.g. benchmark tests) and/or during the calculation of the shares and from the results progressively provided by the first machine learning algorithm. Optionally, also the second machine learning algorithm is trained using the data provided by the computing devices networks used by the first machine learning algorithm.

In one embodiment, the group of processing units connects to a plurality of processor networks. In particular, each computing devices network is configured to seek the solution of at least one respective cryptographic problem. In this case the method is executed in parallel for each different cryptographic problem addressed by each computing devices network. Furthermore, the step of allocating the computing power available in the group of processing units to the calculation of the solution of the cryptographic problem, comprises allocating the computing power available in the group to the calculation of the possible remaining solutions which are calculated in the shortest time.

In one embodiment, wherein the processor networks are mining pools that process the encryption of blocks to be added to a distributed digital ledger managed by a computer network comprising said computer network.

A different aspect of the present invention concerns a group of processing units. In particular, each processing unit is connected to at least one control unit. This control unit is configured to:

connect to at least one computing devices network which collaborate in the search for a solution to a cryptographic problem by calculating possible solutions to said cryptographic problem and performing the method according to any one of the preceding claims.

In one embodiment, the control unit performs an artificial intelligence algorithm trained to perform the method according to the preceding embodiments. Furthermore, the remaining processing units of the group comprise one or more among:

personal computer, smartphone, single board computer, and

ASICs configured to solve cryptographic problems.

Further features and advantages of the present invention will be more evident from the description of the accompanying drawings.

BRIEF DESCRIPTION OF THE DRAWINGS

The invention will be described below with reference to some examples, provided for explanatory and non-limiting purposes, and shown in the accompanying drawings. These drawings illustrate different aspects and embodiments of the present invention and reference numerals illustrating structures, components, materials and/or similar elements in different drawings are indicated by similar reference numerals, where appropriate.

DETAILED DESCRIPTION OF THE EMBODIMENTS

Figures 1, 2:
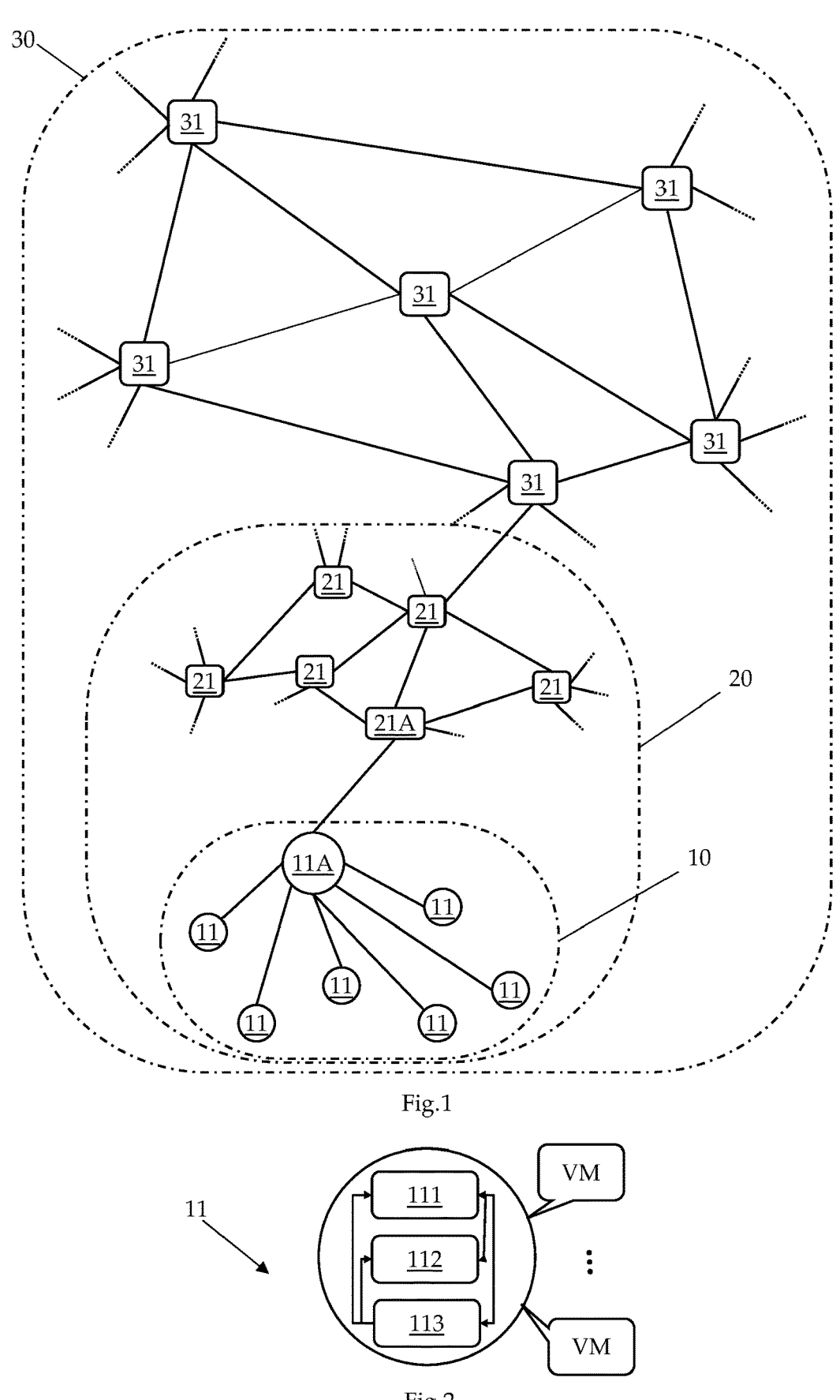
FIG. 1 is a block diagram of a system in which an embodiment of the present invention is implemented.
FIG. 2 is a block diagram of a node of a cluster of processing units included in the system of FIG. 1, a block diagram of greater detail of the system of FIG. 1.

While the invention is susceptible to various modifications and alternative constructions, certain preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The use of "for example", "etc.", "or" denotes non-exclusive alternatives without limitation, unless otherwise indicated. The use of "includes" means "includes, but not limited to" unless otherwise indicated.

Figure 3:
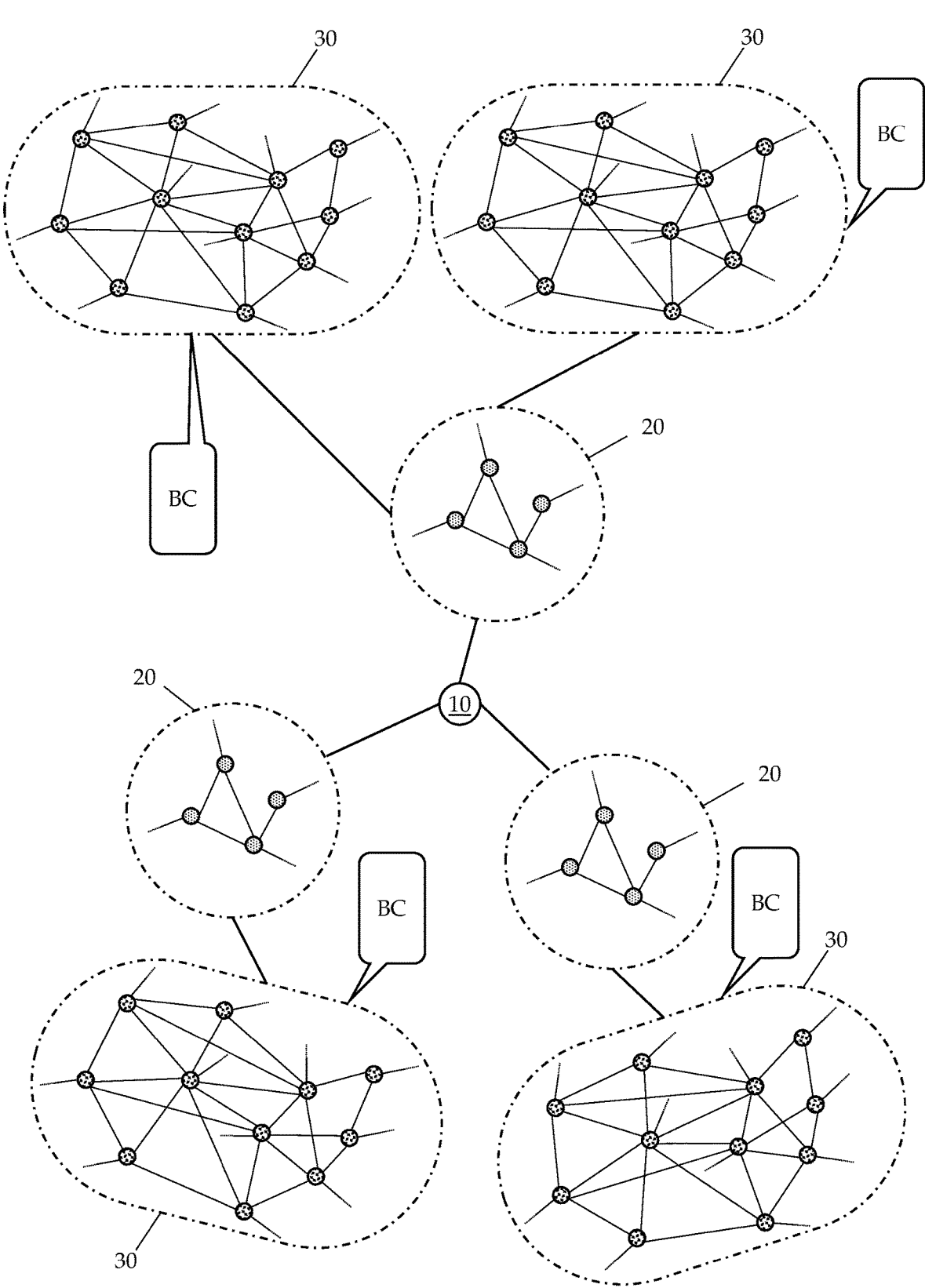
FIG. 3 is a block diagram of a system comprising a plurality of computing devices networks in which an embodiment of the present invention is implemented.

With reference to FIGS. 1-3, a system 1 configured to implement a method according to the present invention comprises one or more groups or clusters 10 of processing units, or nodes 11, configured to exchange data with each other or at least with a controller node 11A of the cluster. Preferably, the nodes 11 are configured to exchange data with each other through a communication channel based on an infrastructure such as a LAN network, a MAN network, a WAN network or the like. Further, the controller node 11A of each cluster 11A is configured to exchange data with one or more electronic computing devices networks 20.

As shown in FIG. 2, each node 11 of the cluster 10 comprises a processing module 111—for example, comprising a CPU and, preferably albeit not in a limiting way, one or more GPUs, or an ASIC—, a communication module 112—for example, comprising a modem—and a power module 113. The processing module 111 is configured to govern the general operation of the node 11 and to solve one or more types of cryptographic problems as described in greater detail below. For this purpose, the processing module implements one or more corresponding software and/or firmware. The communication module 112 is configured to establish a communication channel with at least another node 11 of the cluster 10 and with at least one of the electronic computing devices networks 20 in the case of the controller node 11A—for example a coordinator 21A of the electronic computing devices network 20. Finally, the power module 113 is connected to the other modules 111 and 112 to provide the necessary operating power.

In the preferred embodiment, each node 11 comprises one among a personal computer, a smartphone, a single-board computer, a mining rig, or other similar electronic device.

Each of the electronic computing devices networks 20 to which the cluster 10 is connected, or connectable, is configured to solve at least one cryptographic problem. In the embodiment considered, each electronic computing devices network 20 is a mining pool configured to solve a cryptographic problem linked to the creation and validation of a block of transactions to be added to a respective distributed digital ledger, for example a blockchain BC.

In the case of the mining pools, each of the electronic computing devices networks 20 is part of at least one wider computer network 30, generally a peer-to-peer type network, as schematically illustrated in FIGS. 1 and 3. In other words, an electronic computing devices network 20 constitutes a node of the computer network 30 that manages a corresponding blockchain. The nodes 31 manage the blockchain BC, i.e. they each maintain an updated copy of the blockchain BC, compete to solve the cryptographic problem that allows the addition of a new block to the blockchain BC and validate the correctness of the solutions to the cryptographic problem proposed by the other nodes 31, in a manner known per se and not described in greater detail herein for brevity's sake.

As highlighted in the block diagram of FIG. 3, summing up the cluster 10 operates as a single processor 21 of the electronic computing devices network 20 and, in turn, the electronic computing devices network 20 operates as a single node of each computer network 30 to which it is connected, where each computer network 30 manages a respective blockchain BC.

The electronic computing devices networks 20 use a specific protocol to manage the communications and the subdivision of the computational load necessary for the solution of the cryptographic problem. For example, in the considered case of mining pool, the Stratum V2 protocol is used.

In general, the used protocol provides for the processors in the computing devices network 20 to solve a simplified cryptographic problem. In the case of mining pools, the simplified cryptographic problem consists in calculating a hash, called 'share', starting from the information of a block to be added to the blockchain BC. In particular, the shares are calculated by means of the same hashing algorithm used by the computer network 30 that manages the blockchain BC.

The difference between a share and a hash of a block of the blockchain BC is in their difficulty, in particular the requirements of a share are substantially looser than the requirements of a block hash. In particular, a valid block hash must have a predetermined sequence n of initial symbols, for example a block hash must comprise an initial sequence of n zeros, this value is called network difficulty in jargon. In other words, a new block proposed by the computing devices network 20 is considered a valid candidate for the blockchain BC if it has an initial sequence of n zeros equal to—or greater than—the network difficulty. Shares have a reduced difficulty compared to the network difficulty, i.e. a share is considered valid if it comprises a number m of symbols, where m is lower than n, for example the share difficulty is equal to a sequence of five zeros. Consequently, the shares can be calculated in a simpler way by the processors 21 of the computing devices network. In addition, as known, a part of share will have a difficulty equal to the network difficulty, among this subset of share there is the correct hash that encodes the new block proposed by the electronic computing devices network.

In order to actively participate in solving the cryptographic problem faced by the electronic computing devices network 20, a generic processor must be able to solve a cryptographic problem having the predetermined share difficulty quickly and/or calculate multiple solutions to the cryptographic problem in parallel—i.e. calculate, multiple share in parallel.

In the embodiments of the present invention, the nodes 11 of the cluster 10 have limited computing power, generally insufficient to solve the cryptographic problem with a sufficient speed or parallelism to participate significantly in the electronic computing devices network 20. In the case of a mining pool, this means that the nodes 11 of the cluster 10, considered individually, have a limited hashrate insufficient to calculate shares at a sufficiently high rate, so as to actively contribute to the identification of the correct hash for the proposed new block and, therefore, share rewards associated with the solution of the cryptographic problem assigned by the computer network 30, when the proposed new block is accepted.

Figure 4:
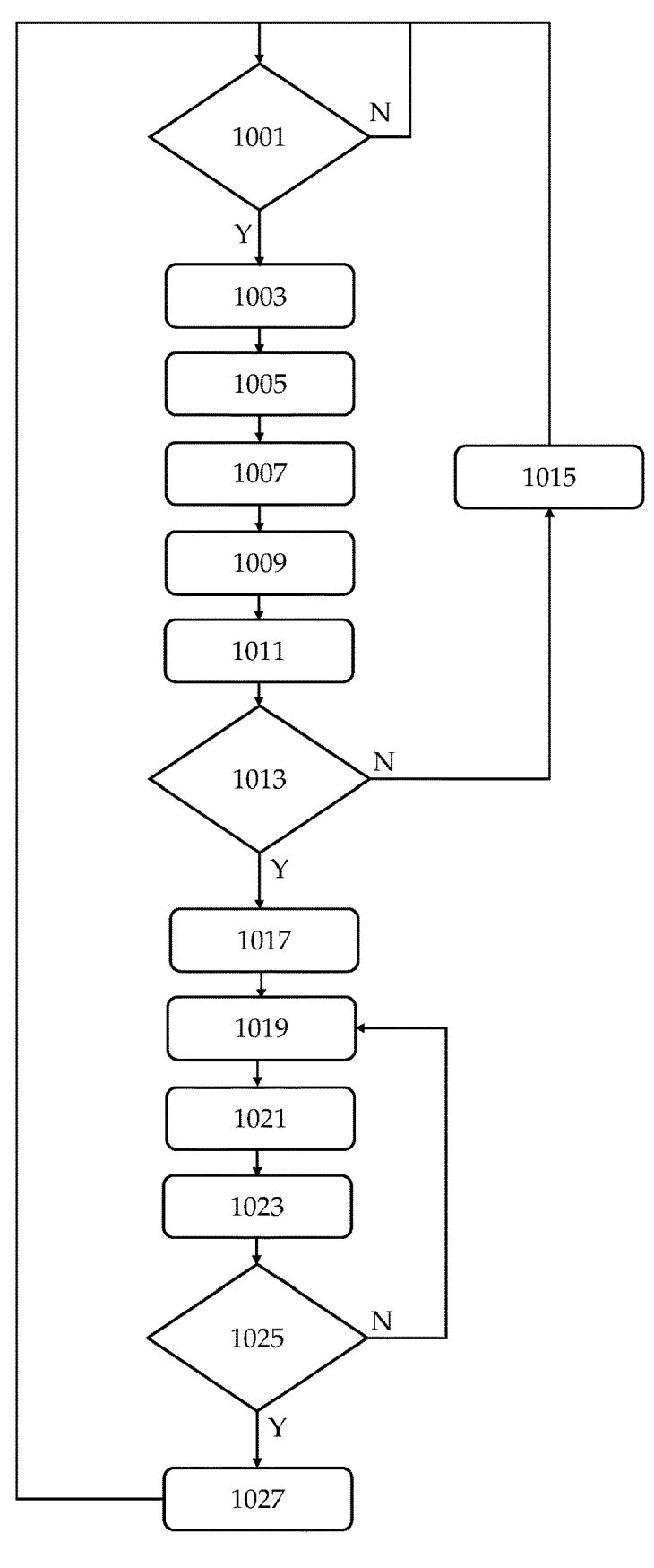
FIG. 4 is a flowchart of a method for managing a group or cluster of processing units according to an embodiment of the present invention.

The nodes 11 of each cluster 10 are managed by the corresponding controller node 11A of the cluster in order to solve cryptographic problems provided by one or more electronic computing devices networks 20 to which the cluster 10 is connected, efficiently according to the management method 1000 described below, of which FIG. 4 is a flowchart. In particular, below reference will be made to the specific case where the cluster 10 is connected to a plurality of mining pools 20 each is connected to at least one computer network 30 to propose new blocks to be added to the blockchain BC maintained by said computer network 30, by calculating their respective hash.

The controller node 11A verifies, for each mining pool 20, whether there are new blocks being calculated for each one of the blockchains BC (decision step 1001), in the negative case (output branch N of step 1001) the controller node 11A reiterates the verification, possibly, after waiting for a predetermined delay time—in other words, step 1001 is reiterated cyclically until it is detected that a mining pool is calculating the hash for a new block being calculated, or new block proposed below.

For each block being processed—i.e. for which the corresponding hash is calculated, the controller node 11A analyses the hash calculation trend of the proposed new block for each blockchain BC (step 1003). In the example considered, the controller node 11A detects for each mining pool:

the number of processors 21 of the mining pool 20 that are actively seeking the hash of the proposed new block for the blockchain BC, the network difficulty, i.e. the difficulty of the hash to be identified, and a number of shares already calculated by the processors 21 of the mining pool 20 referred to this new block proposed by the mining pool 20.

Based on the acquired data, the controller node 11A estimates an amount of remaining shares, i.e. still to be calculated in order to identify the share corresponding to the hash of the proposed new block for the blockchain BC (step 1005) and calculates a size in terms of hash or bytes of the remaining shares (step 1007).

Next, the controller node 11A determines an amount of resources necessary to calculate the remaining shares within a desired period of time (step 1009). For example, the controller node 11A calculates a total hashrate necessary to calculate the amount of remaining shares in the desired period of time. Preferably, the predetermined period of time is equal to or lower than 100 seconds, even more preferably, the predetermined period of time is equal to or lower than 80 seconds.

The controller node 11A determines an available computational capacity of the cluster 10 (step 1011).

In the embodiments of the present invention, the controller node 11A is configured to determine a number of instances of virtual machines VM executable in parallel on each node 11 that may be dedicated to calculating the remaining shares. In greater detail, each virtual machine VM replicates a type of hardware device that can be used for the solution of a cryptographic problem. In the non-limiting example considered, each virtual machine VM replicates a Graphics Processing Unit or GPU. Each virtual machine VM has its own known hashrate.

Next, the controller node 11A verifies whether the cluster 10 has available computational power sufficient to calculate the remaining shares of at least one of the new blocks proposed by the mining pools 20 within the predetermined period of time (decision step 1013). In the embodiments of the present invention, the controller node 11A verifies whether the number of virtual machines VM that can be allocated in the cluster 10 guarantees a hashrate such as to allow calculating the remaining shares within the predetermined period of time.

In the negative case (output branch N of step 1013), the controller node 11A does not allocate computational power for the calculation of the remaining shares (step 1015) and the method 1000 is reiterated by step 1001 to identify a set of remaining shares—associated with a different new block proposed by one of the mining pools 20—that can be calculated by the cluster 10. In this way it is possible to obtain a better energy efficiency of the cluster 10 by directing the available computing power towards the calculation of remaining shares where there is the highest likelihood of success and/or avoiding energy consumption when no calculation of remaining shares is associated with a sufficiently high likelihood of success (dependent on the ability to complete the calculation of the remaining shares with a timing lower than or at least equal to that of the other processors 21 of the mining pool 20).

Otherwise, if the controller node 11A determines that the cluster 10 is able to calculate the remaining shares within the predetermined period of time (output branch Y of step 1013), the controller node 11A instantiates, if necessary, and allocates a number of virtual machines VM available in the cluster 10 corresponding to or greater than the minimum number of virtual machines VM that allows to calculate the remaining shares in the predetermined period of time (step 1017). In other words, the controller node 11A selects a number of virtual machines VMs sufficient, or greater, to calculate all the remaining shares within the predetermined period of time. For example, the controller node 11A allocates a number of virtual machines VM at least equal to the number of remaining shares to be calculated—so that each virtual machine VM calculates a respective share in parallel. Alternatively, the controller node 11A allocates a number of virtual machines VM lower than the number of remaining shares, but which together reach a hashrate such as to guarantee that all the remaining shares are calculated in a time lower than or equal to the predetermined period of time.

Subsequently, each virtual machine VM allocated by the controller node 11A calculates one or more of the remaining shares (step 1019) and the controller node 11A receives each calculated share from the virtual machines VM running on the nodes 11 of the cluster (step 1021). The calculated remaining shares are sent to the mining pool 20 (step 1023). In general, the controller node 11A may send the calculated solutions as soon as they are calculated or in groups of a predetermined number of solutions.

The cluster 10 continues to calculate the remaining shares until it has calculated all the remaining shares or once the share matching the hash corresponding to the new block proposed by the mining pool 20, i.e. the share corresponding to the hash having difficulty equal to the network difficulty, is recognized by the mining pool 20 or a new block proposed by another element of the computer network 30 is added to the blockchain BC instead of the new block proposed by the mining pool 20 (decision step 1025 and output branch N of the same). In particular, the controller node 11A receives a confirmation from the mining pool 20 when the new block proposed by the mining pool 20, associated with the calculated hash, is added to the corresponding blockchain BC.

When a new block is added to the blockchain 30 (output branch Y of step 1025), the controller node 11A releases the computing power of the cluster 10 allocated to solving the cryptographic problem now solved (step 1027). In other words, the virtual machines VM are de-instantiated or are put on standby until they are assigned to the calculation of new shares provided by a mining pool 20 selected by the controller node 11A.

Subsequently, the method 1000 is reiterated from the beginning—i.e. from step 1001—in order to select a new allocation of resources for the calculation of new shares.

In the above-described embodiment, the controller node 11A of the cluster 10 implements artificial intelligence for the automated management of the resources of the cluster 10. In particular, the artificial intelligence comprises a first machine learning algorithm trained to determine the number of remaining shares and determine the corresponding volume in bytes (and/or hashes), based on the information collected by the mining pool in step 1003. In addition, the artificial intelligence comprises a second machine learning algorithm trained to determine which one(s) of the remaining share set(s) of one or more proposed new blocks currently being calculated is most successfully calculable within the predetermined period of time and which is the best allocation of computational resources, in particular of the virtual machines instantiated or instantiable in the cluster 10, to compute the remaining shares.

Preferably, the first machine learning algorithm is trained by monitoring the trend of the share calculation performed by the processors of at least one, preferably a plurality of, mining pools for determining the remaining shares. In addition, the second machine learning algorithm is trained on the basis of analysis of the trend of the operation—i.e. of operation data—of the processing units of the network, for example in number of instantiable virtual machines, continuity of operation, data exchange speed, etc., of each node of the cluster preferably during test periods (e.g. benchmark tests) and/or during the calculation of the shares and from the results progressively provided by the first machine learning algorithm. Optionally, the second machine learning algorithm is also trained by using the data provided by the mining pools.

However, it is clear that the above examples must not be interpreted in a limiting sense and the invention thus conceived is susceptible of numerous modifications and variations.

For example, in an alternative embodiment, each processing unit is configured to record/update its own copy of one or more digital ledgers distributed independently of the other processing units.

Furthermore, in one embodiment the controller node may be configured to optimize the allocation of the computational resources based on the reward system envisaged by each of the mining pools. For example, in a first embodiment the controller node preferably allocates the computational resources in mining pools following a Pay Per Last N-Share (PPLNS) reward scheme. Secondarily, if the likelihood of obtaining a reward is lower than a threshold value, the controller node verifies if it is possible to calculate the remaining shares in one or more mining pools that use a Pay Per Share (PPS) type reward scheme. The Applicant has determined that surprisingly this resource allocation scheme based on the type of reward does not conflict with the primary purpose i.e. the optimization of energy consumptions due to the calculation of the possible solutions of a cryptographic problem nor does it limit the prolongation of the useful life of the devices that constitute the nodes of the clusters.

As will be apparent to the person skilled in the art, one or more steps of the above-described method 1000 may be performed in parallel with each other or in an order different from that presented above. Similarly, one or more optional steps may be added or removed from the method 1000.

In particular, the controller node 11A may perform two or more iterations of steps 1011-1021 of the method 1000 in parallel, in order to calculate the solution of two or more different cryptographic problems proposed by one or more computing devices network 20 in parallel—as long as the cluster 10 has sufficient computing power available to be allocated for the calculation of such solutions.

In one embodiment, the method 1000 is performed only for the solution of one or more cryptographic problems already being processed in the computer network. In other words, the method 1000 is applied to the solution of cryptographic problems to which one or more nodes of the computer network have provided at least one solution proposal. Optionally, an application interval of the method 1000 can be defined—for example, based on the network difficulty and/or on the computing power of the cluster. The application interval allows to rule out the cryptographic problems that are too complex for the cluster and to concentrate the computing power available in the solution of the cryptographic problems that can be solved by the cluster.

Naturally, all the details can be replaced with other technically-equivalent elements.

For example, although reference has been made in the description to the use of the cluster and the methods according to the present invention for the solution of a cryptographic problem linked to the addition of a new block of a distributed ledger, nothing prevents implementing the cluster and the methods described above for operating in a computing devices network configured to solve a cryptographic problem used for the certification of information transmitted through such network.

For example, although reference has been made above to virtual machines that replicate GPUs, nothing prevents CPUs or other types of data processing units from being simulated in alternative embodiments.

In conclusion, the materials used, as well as the contingent shapes and dimensions of the aforementioned devices, apparatuses and terminals, may be any according to the specific implementation requirements without thereby abandoning the scope of protection of the following claims.

The invention claimed is:

1. A method for managing a group of processing units configured to solve a cryptographic problem, the method comprises a control unit of the group performing the steps of:

connecting to at least one computing devices network which collaborate in the search for a solution to a cryptographic problem by calculating possible solutions to said cryptographic problem, determining a computing power available for each processing unit of the group of processing units;

calculating a computing power of the group based on the available computing power of each processing unit of the group, determining a number of possible remaining solutions of the cryptographic problem which are still to be calculated by the computing devices network, determining whether the computing power available of the group allows to calculate said possible remaining solutions in a predetermined period of time, and in an affirmative case, allocating the computing power available in the group of processing units to the calculation of the solution of the cryptographic problem, acquiring from the at least one computing devices network the following information:

a number of processors engaged in the calculation of the possible solutions of the cryptographic problem, an indicator of the complexity of the correct solution of the cryptographic problem, and a number of possible solutions already calculated by the processors from the at least one computing devices network, and wherein the step of determining a number of possible remaining solutions of the cryptographic problem provides for determining the number of possible remaining solutions based on the acquired information.

2. The method according to claim 1, further comprising a step of calculating an indication of the computing power necessary to calculate the possible remaining solutions, and wherein the step of determining whether the computing power available in the group of processing units calculates said possible remaining solutions in a predetermined period of time is based on said indication of the computing power necessary to calculate the possible remaining solutions.

3. The method according to claim 2, wherein the possible solutions of the cryptographic problem are hashes, and the method further comprises performing a further step of calculating a hashrate necessary to calculate the possible remaining solutions within said predetermined period of time on the basis of said indication of the computing power necessary to calculate the possible remaining solutions.

4. The method according to claim 2, further comprising a step of calculating a number of virtual machines currently executable in each processing unit of the group, wherein each virtual machine implements a processor configured to calculate at least one possible solution of the cryptographic problem, and wherein the step of determining whether the computing power available in the group of processing units calculates said possible remaining solutions in a predetermined period of time provides for verifying whether the computing power of the virtual machines currently allocable allows to calculate said possible remaining solutions in the predetermined period of time.

5. The method according to claim 4, wherein said virtual machines are graphics processing units.

6. The method according to claim 1, wherein the one group of processing units connects to a plurality of computing devices networks, each computing devices network is configured to seek the solution of at least one respective cryptographic problem, and further comprising: —determining a number of possible remaining solutions of the cryptographic problem which are still to be calculated by the computing devices network, —determining a computing power available for each processing unit of the group of processing units; —determining whether the computing power available in the group of processing unit allows to calculate said possible remaining solutions in a predetermined period of time, are performed in parallel for each different cryptographic problem faced by each computing devices network of said plurality of computing devices networks, and wherein the step of allocating the computing power available in the group of processing units to the calculation of the solution of the cryptographic problem provides for allocating the computing power available in the group to the calculation of the possible remaining solutions which are calculated in the shortest time.

7. The method according to claim 6, wherein the computing devices networks are mining pools that process the encryption of blocks to be added to a distributed digital ledger managed by a computer network comprising said computing devices network.

8. The group of processors, each processor connected to at least one control unit, said control unit configured to: connect to at least one computing devices network which collaborate in the search for a solution to a cryptographic problem by calculating possible solutions to said cryptographic problem, and perform the method of:

connecting to at least one computing devices network which collaborate in the search for a solution to a cryptographic problem by calculating possible solutions to said cryptographic problem, determining a computing power available for each processing unit of the group of processing units;

calculating a computing power of the group based on the available computing power of each processing unit of the group, determining a number of possible remaining solutions of the cryptographic problem which are still to be calculated by the computing devices network, determining whether the computing power available of the group allows to calculate said possible remaining solutions in a predetermined period of time, and in an affirmative case, allocating the computing power available in the group of processing units to the calculation of the solution of the cryptographic problem, acquiring from the at least one computing devices network the following information:

a number of processors engaged in the calculation of the possible solutions of the cryptographic problem, an indicator of the complexity of the correct solution of the cryptographic problem, and a number of possible solutions already calculated by the processors from the at least one computing devices network, and wherein the step of determining a number of possible remaining solutions of the cryptographic problem provides for determining the number of possible remaining solutions based on the acquired information.

9. The group according to claim 8, wherein the control unit performs an artificial intelligence algorithm trained to perform the method, and wherein the remaining processing units of the group comprise one or more of: personal computer, smartphone, single board computer, and ASICs configured to solve cryptographic problems.

\* \* \* \* \*